(12) United States Patent
Kohiro et al.

(10) Patent No.: US 6,497,854 B2
(45) Date of Patent: Dec. 24, 2002

(54) CATHODE MATERIAL FOR A LITHIUM SECONDARY BATTERY AND METHOD FOR MANUFACTURING SAME

(75) Inventors: Kenji Kohiro, Ibaraki (JP); Ryuichi Nagase, Ibaraki (JP)

(73) Assignee: Nikko Materials Company, Limited, Tokyo (JP)

( * ) Notice: Subject to any disclaimer, the term of this patent is extended or adjusted under 35 U.S.C. 154(b) by 15 days.

(21) Appl. No.: 09/828,734

(22) Filed: Apr. 9, 2001

(65) Prior Publication Data

US 2002/0102204 A1 Aug. 1, 2002

(30) Foreign Application Priority Data

Nov. 30, 2000 (JP) .................................. 2000-364075

(51) Int. Cl.⁷ .................. C01D 15/00; C01G 53/00; C01G 51/00; C01G 23/00; C01F 7/00
(52) U.S. Cl. .............. 423/594; 252/519.12; 252/519.14; 252/519.15
(58) Field of Search ...................... 423/594; 252/519.12, 252/519.14, 519.15; 429/223

(56) References Cited

U.S. PATENT DOCUMENTS 5,631,105 A * 5/1997 Hasegawa et al. .......... 423/594

FOREIGN PATENT DOCUMENTS

| JP | 10-134811 | 5/1998 |
| JP | 10-241691 | 9/1998 |
| JP | 3045998 B2 | 3/2000 |
| JP | 2000-90933 | 3/2000 |
| JP | 2000-113890 | 4/2000 |
| JP | 3088716 B1 | 7/2000 |

OTHER PUBLICATIONS

Liu et al., "Synthesis and Characterization of $LiNi_{1-x-y}Co_xMn_yO_2$ as the Cathode Materials of Secondary Lithium Batteries", J. Power Sources, vols. 81–82, pp 416–419, 1999 (month unknown).

Kubo et al., "Synthesis and Charge–Discharge Properties of $Li_{1-x}Ni_{1-x-y}Co_yO_{2-z}F_z$", J. Power Sources, vols. 81–82, pp 599–603, 1999 (month unknown).

Ohzuku et al., "Innovative Insertion Material of $LiAl_{1/4}Ni_{3/4}O_2$ (R3m) for Lithium–Ion (shuttlecock) Batteries", J. Power Sources, vol. 68, pp 131–134, 1997 (month unknown).

\* cited by examiner

Primary Examiner—Steven Bos
(74) Attorney, Agent, or Firm—Howson and Howson

(57) ABSTRACT

A cathode material for a lithium secondary battery having a high capacity, an excellent cycle property, and an excellent thermal stability. The cathode material for the lithium secondary battery is a layered compound having a general formula: $Li_xNi_{1-a-b-c-d}CO_aM_{1b}M_{2c}M_{3d}O_2$, wherein $M_1$, $M_2$, $M_3$ are selected from Ti, Mg, B and Al and wherein the characters x, a, b, c and d respectively satisfy $1.0 \leq x \leq 1.2$; $0.3 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$

6 Claims, 3 Drawing Sheets

CATHODE MATERIAL FOR A LITHIUM SECONDARY BATTERY AND METHOD FOR MANUFACTURING SAME

FIELD OF THE INVENTION

The present invention relates to a cathode material of a lithium secondary battery, particularly a $LiNiO_2$ type layered compound having high capacity and excellent cycle and safety properties.

BACKGROUND OF THE INVENTION

Since a lithium secondary battery has a high energy density as compared with conventional secondary batteries, it has been widely used as a battery for electronic appliances such as mobile phones, portable video cameras, notebook type personal computers, and the like, and in the future, it is expected to be used as a dispersion installation type power source for use in households and electric vehicles. Therefore, investigation and development is currently being undertaken to obtain a battery with improved capacity and efficiency.

A cathode active material presently being sold on the market for a lithium secondary battery is $LiCoO_2$. However, its thermal stability is insufficient and the reserves of cobalt are limited. Hence, this compound has disadvantages in terms of stable supply and cost.

As a substituent for $LiCoO_2$, an $LiMn_2O_4$ type spinel compound has drawn attention owing to abundant reserves and cost advantages.

Although an $LiMn_2O_4$ type spinel compound has excellent thermal stability and safety properties, it has a capacity per unit weight (hereinafter referred to as active material capacity) of only about ⅔ of that of the cobalt compound and therefore, is scarcely used for mobile phones or the like which require a high capacity.

Furthermore, a secondary battery produced using the spinel compound has an insufficient cycle property and an inadequate self-discharging property at a temperature of 50° C. or higher. In addition, there are serious problems in practical use of the battery in electric vehicles, in which the battery is most highly expected to be utilized.

Thus, enthusiastic investigation has been performed for a nickel-cobalt compounded oxide whose reserves are estimated high and whose active material capacity exceeds that of a cobalt-based compound.

However, such a compound is difficult to synthesize in atmospheric air and requires an oxygen atmosphere, and Ni of the compound tends to occupy the Li site. Thus, there are many technical problems to overcome in order to produce by a practical method a compound having sufficiently satisfactory properties.

Furthermore, such a compound has the problem that both the cycle property and the thermal stability are inferior to those of $LiCoO_2$.

For purposes of improving these defects, additional elements have been added to the nickel-cobalt compound.

Japanese Patent Laid-Open No. 2000-90933 and Japanese Patent Laid-Open No. 10-134811 provide a discussion of the selection of elements to be added to such a compound. According to these references, elements having a size 0.8 to 1.5 times as large as the ion radius of $Ni^{3+}$, 0.56 Å, are stated as being proper.

J. Power Sources 81–82 (1999) 416–419 discloses improving cycle property by adding Mn. However, this results in providing an active material capacity which is decreased to 150 mAh/g. Since the active material capacity of the cobalt-based compound is 150 mAh/g, the advantage of the nickel-cobalt-based compound is canceled.

J. Power Sources 81–82 (1999) 599–603 discloses cycle property improvement by adding F which results in providing about 180 mAh/g active material capacity. However, no discussion of thermal stability is given.

J. Power Sources 68 (1997) 131–134 reports that addition of aluminum to nickel leads to an improvement of thermal stability. However, in this case, the active material capacity is also decreased to about 150 mAh/g.

The active material capacity is decreased by the addition of other elements to the nickel-cobalt compound because the absolute amount of nickel is decreased.

The addition of a single element requires a relatively large added quantity to improve either the cycle property or the thermal stability. This relatively large addition inevitably decreases the active material capacity. To overcome such disadvantages, two or more kinds of elements have to be added.

Addition of two or more elements also has been disclosed, for instance, in Japanese Patent No. 3045998 which discloses that both the cycle property and the thermal stability are improved by adding titanium and magnesium. However, in this case, the active material capacity is 160 mAh/g or lower.

In Japanese Patent Laid-Open No. 2000-113890, the cycle property is increased by the addition of aluminum and magnesium; however, the active material capacity is 150 mAh/g or lower in this example.

Thus, the fact that a decrease in active material capacity cannot be suppressed even if two kinds of elements are added is attributed at least partially to the selection of improper elements, and it is also believed that it is difficult to improve all of the properties by combination of two kinds of elements.

Addition of three or more elements is disclosed in Japanese Patent Laid-Open No. 10-241691. Mg is used as an essential element to add to improve the properties of cobalt-based, nickel-based, and manganese-based materials, and the patent discloses that Mg contributes to improvement of electron conductivity and cycle property.

In this case, although there is given a description that the thermal stability may also be improved, the effect on the active material capacity is uncertain. Further, Japanese Patent No. 3088716 discloses that the addition of Mg does not improve electron conductivity and cycle property.

Thus, it is clear that the types and numbers of elements to be added are very difficult to determine, and available opinions on the subject from various laboratories, institutes and the prior art are thoroughly different.

OBJECT OF THE INVENTION

An object of the present invention is to solve the above-mentioned problems and to provide a method for producing a cathode material having a high capacity, an excellent cycle property, and a safety property by adding three or more kinds of elements to a lithium nickelcobaltate.

SUMMARY OF THE INVENTION

The inventors of the present invention have found that an addition of three or more kinds of elements selected from Ti, Mg, B, and Al provides remarkable improvements of properties as results of extensive investigation of a method for producing $Li_xNi_{1-a}Co_aO_2$ carried out to achieve the foregoing purposes.

Furthermore, in the case of producing the foregoing material, the inventors of the present invention have determined that: the elements to be added must be mixed evenly; a coprecipitation method provides a proper method to satisfy this requirement; and with respect to the reaction with an Li compound, a firing method must be carried out in a proper manner.

The present invention has been developed based on the foregoing findings and provides a cathode material for a lithium secondary battery having a high capacity, an excellent cycle life, and thermal stability.

According to the present invention, the cathode material for a lithium secondary battery is a layered compound having a general formula of $Li_xNi_{1-a-b-c-d}Co_aM_{1b}M_{2c}M_{3d}O_2$ of which $M_1$, $M_2$ and $M_3$ are selected from the group consisting of Ti, Mg, B, and Al. In the formula, the reference characters x, a, b, c and d satisfy the following: $1.0 \leq x \leq 1.2$; $0.1 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$.

According to another aspect of the present invention, a method for producing the above described cathode material for a lithium secondary battery is provided. To this end, the above described material is produced by mixing $Ni_{1-a-b-c-d}Co_aM_{1b}M_{2c}M_{3d}(OH)_2$ produced by a coprecipitation method with an Li compound and by firing the resultant mixture at 480 to 850° C. in the atmospheric air or in an oxygen atmosphere.

According to a further aspect of the present invention, a method for producing the above described cathode material for a lithium secondary battery is provided in which the above described material is produced by mixing $Ni_{1-a-b-c-d}Co_aM_{1b}M_{2c}M_{3d}(OH)_2$ produced by a coprecipitation method with an Li compound, by firing the resultant mixture at 480 to 630° C. for 15 to 40 hours in the atmospheric air or in an oxygen atmosphere, by pulverizing the obtained material, and by further firing the pulverized material at 700 to 850° C. for 3 to 10 hours in the same atmosphere.

DETAILED DESCRIPTION OF THE PREFERRED EMBODIMENTS

Figure 1:
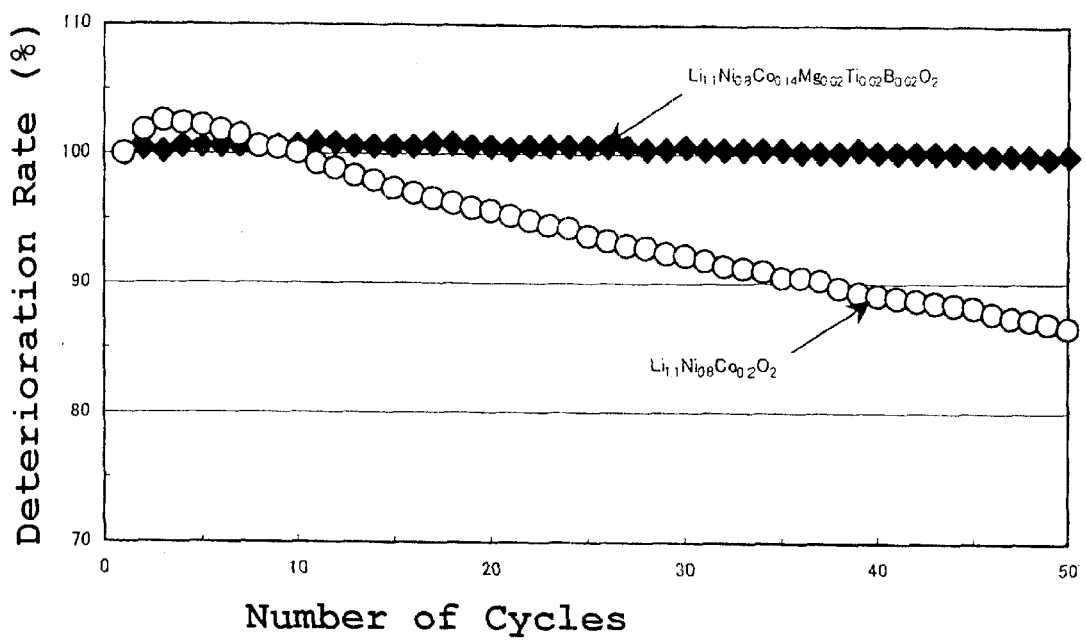
FIG. 1 is a graph showing the cycle properties of a coin type battery produced using a lithium nickelcobaltate obtained in example 1.

Hereinafter, the preferred embodiments of the present invention will be described in detail.

The most important characteristic of the present invention is that the material to be used as a cathode material for a lithium secondary battery is a layered compound having a general formula: $Li_xNi_{1-a-b-c-d}Co_aM_{1b}M_{2c}M_{3d}O_2$ of which $M_1$, $M_2$, and $M_3$ are selected from Ti, Mg, B and Al and in which characters x, a, b, c and d respectively satisfy $1.0 \leq x \leq 1.2$; $0.1 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$.

Although many metals can be exemplified as metals which are possible to be added to a lithium-intercalatble compound with a layer structure having a general formula $Li_xNi_{1-a}CO_aO_2$, the number is limited to some extent in terms of ion radius of which consideration is taken above.

Next, in the case of a material such as a battery material whose practical use is deeply related to material cost, the option of using a noble metal is unthinkable. Further, from a viewpoint of substituting an element for nickel, anions are eliminated from the possible elements. Furthermore, taking a future environmental problem into consideration, elements with high toxicity cannot be used.

In consideration of the above-mentioned matters, elements are selected from those which belong to groups 2A to 4B from the second period to the fourth period of the periodic table and whose toxicity is low. Particular examples are B, C, Mg, Al, Si, Ca, Sc, Ti, V, Mn, Fe, Cu, Zn and the like.

Based on the foregoing consideration, $Ni_{1-x}Co_x(OH)_2$ and a variety of compounds of additive elements and $LiOH-H_2O$ where mixed and fired in a variety of conditions to produce a lithium nickelcobaltate.

At the same time, an additive element and sulfuric acid solutions of nickel and cobalt were subjected to a coprecipitation method to produce a hydroxide and the obtained hydroxide and $LiOH-H_2O$ were mixed and fired to produce a lithium nickelcobaltate.

The cycle property and thermal stability of the obtained cathode materials were measured, and it was found that the latter material obtained by coprecipitation method had better properties but showed a greater decrease in active material capacity Next, a lithium nickelcobaltate was produced in the same method while two kinds of additive elements being added. In this case, if the elements are selected from the foregoing specified elements, materials which have an excellent cycle property or an excellent thermal stability were obtained; but, no material was satisfactory in both properties.

Also, it was shown that materials produced by a coprecipitation method had good properties as compared with materials produced by adding additive compounds. This provided the same result as found in the case where only one element was added.

Further, a lithium nickelcobaltate was produced in the same method while three or more kinds of additive elements were added. The elements were selected based on the findings found when one or two elements were added.

More particularly, Mg, Ti and the like were remarkably effective to improve cycle property, and B, Al and the like were remarkably effective to improve thermal stability.

Additionally, although Mg and Ti were effective in improving cycle property, in the case where Mg or Ti was solely used, the effectiveness was low. Whereas, in the case where Mg and Ti were both used together, the improvement of cycle property was drastic.

The above-mentioned examples are only some of the obtained findings and, based on these findings, attempts were made to add three or more kinds of elements. As a result, the cycle property and the thermal stability were found remarkably improved and the active material capacity was found scarcely decreased in the case where the material was a layered compound having a general formula: $Li_x Ni_{1-a-b-c-d} Co_a M_{1b} M_{2c} M_{3d} O_2$ of which $M_1$, $M_2$ and $M_3$ are selected from Ti, Mg, B and Al and in which the characters x, a, b, c and d respectively satisfy $1.0 \leq x \leq 1.2$; $0.1 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$.

Further, such effects were remarkable in the case of using $Ni_{1-a-b-c-d} Co_a M_{1b} M_{2c} M_{3d} (OH)_2$ produced by a coprecipitation method employed as a method for producing a lithium nickelcobaltate.

As for firing conditions after mixing with an Li compound, it was required to carry out firing at 480 to 850° C. in the atmospheric air, or alternatively in an oxygen atmosphere. In addition, further stable effects were obtained by firing at 480 to 630° C. for 15 to 40 hours, pulverizing the obtained material, and then further firing the pulverized material at 700 to 850° C. for 3 to 10 hours.

EXAMPLES

Hereinafter, some examples of the present invention will be described according to practical embodiments, and these examples are not intend to limit the present invention in any circumstances.

At first, the evaluation method of the present invention will be described. The battery's properties were evaluated by using a coin type cell in a laboratory size.

To this end, the cathode employed was produced by mixing a cathode active material, a conductive carbon, and poly (vinylidene fluoride) as a binder with n-methylpyrrolidone and applying the resultant paste to an aluminum foil by a doctor blade method. The anode employed was produced by pressure bonding a metallic lithium plate to a nickel mesh.

The separator employed was one made of polypropylene, and an electrolytic solution used was produced by adding 1 M of $LiPF_6$ as supporting salt to a mixture of ethylene carbonate (EC) and dimethyl carbonate (DMC) in a 1:1 ratio. The properties of the obtained battery were measured at 25° C., a charging-discharging current density of 0.2 mA/cm², and a cut-off voltage of 3.0 to 4.3 V.

The evaluation of the thermal stability was carried out by measuring the temperature of a charged cathode. A coin type cell with a similar structure as that of a cell subjected to the battery's property was disassembled after charging and the cathode was taken out and vacuum dried after being washed with DMC. The cathode was subjected to thermogravimetic analysis while Ar gas was being introduced. The thermal stability was evaluated based on the peak temperature between 200 to 300° C., supposedly attributed to oxygen release, by differentiating the obtained data.

Example 1

Metallic nickel and metallic cobalt were measured as to be Ni:Co=0.8:0.14 (mole ratio, hereinafter the same) and dissolved in a 50 wt. % sulfuric acid solution.

Magnesium nitrate, titanium chloride, and ammonium tetraborate were added to the resultant solution as to be Ni:Co:Mg:Ti:B=0.8:0.14:0.02:0.02:0.02 and the concentration of the solution was adjusted as to control the total of nickel, cobalt, magnesium, titanium, and boron of 60 g/L.

Further, ammonium chloride was added to the solution to control pH to about 5, and then a 6 mol/L sodium hydroxide solution was added to coprecipitate mixed hydroxides. The hydroxides after coprecipitation were washed several times and then dried. The obtained powder was spherical and formed in a whisker-like primary particle.

$LiOH-H_2O$ was then added to the powder as to be Li:(Ni+Co+Mg+Ti+B)=1.1:1 and mixed and fired at 750° for 10 hours.

As a result of phase identification by x-ray diffraction, the obtained compound had a layered rock salt structure (hexagonal system: R3m), and no other phase was detected. A coin type battery was produced using the compound, and the battery's properties were evaluated.

FIG. 1 shows the cycle property and that cycle property deterioration was extremely scarce. Table 1 shows the results of the active material capacity and thermal analysis (the position of the peak by oxygen release in the differential curve of the weight decrease measured by thermogravimetic analysis.)

The active material capacity was not significantly lower than the active material capacity, 180 mAh/g or higher, of lithium nickelcobaltate with no additive element. Further, as for the thermal stability, the oxygen release temperature was remarkably increased.

The results of the active material capacity and the thermal stability of the lithium nickelcobaltate obtained in the above described example 1 are shown in Table 1.

Example 2

A similar experiment was carried out using Al instead of B as in example 1. As the Al compound, aluminum nitrate was used. The results were almost similar to those of the example 1. In the case of other combinations, the results were similar.

The results of the active material capacity and the thermal stability of the lithium nickelcobaltate obtained in the above described example 2 are shown in Table 1 as well.

Example 3

The mixed hydroxides obtained in example 1 and $LiOH-H_2O$ were mixed in the same ratio and fired at 550° C. in an oxygen atmosphere for 24 hours and then pulverized and further fired at 750° C. for 5 hours. Although the cycle property and the thermal stability were the same as those of the foregoing examples, the active material capacity was 180 mAh/g or higher. The results of the active material capacity and the thermal stability of the lithium nickelcobaltate obtained in the above described example 3 are shown in Table 1 as well.

TABLE 1

Table 1 shows the active material capacity and the thermal stability of lithium nickelcobaltate obtained in examples 1 to 3 and comparative examples 1 to 4.

| | Cathode Composition | Raw Material | Firing Method | Active Material Capacity (mAh/g) | Thermal Stability (° C.) |
|---|---|---|---|---|---|
| No additive | $Li_{1.1}Ni_{0.8}Co_{0.2}O_2$ | coprecipitation | 1-step firing | 196 | 223 |
| Example 1 | $Li_{1.1}Ni_{0.8}Co_{0.14}Mg_{0.02}Ti_{0.02}B_{0.02}O_2$ | coprecipitation | 1-step firing | 179 | 255 |
| Example 2 | $Li_{1.1}Ni_{0.8}Co_{0.14}Mg_{0.02}Ti_{0.02}Al_{0.02}O_2$ | coprecipitation | 1-step firing | 178 | 256 |
| Example 3 | $Li_{1.1}Ni_{0.8}Co_{0.14}Mg_{0.02}Ti_{0.02}B_{0.02}O_2$ | coprecipitation | 2-step firing | 185 | 258 |
| Comparative example 1 | $Li_{1.1}Ni_{0.8}Co_{0.14}Mg_{0.02}Ti_{0.02}B_{0.02}O_2$ | compound | 2-step firing | 160 | 222 |
| Comparative example 2 | $Li_{1.1}Ni_{0.8}Co_{0.14}Mg_{0.03}Ti_{0.03}O_2$ | coprecipitation | 2-step firing | 170 | 224 |
| Comparative example 3 | $Li_{1.1}Ni_{0.8}Co_{0.14}Mg_{0.03}B_{0.03}O_2$ | coprecipitation | 2-step firing | 191 | 256 |
| Comparative example 4 | $Li_{1.1}Ni_{0.8}Co_{0.14}Mg_{0.03}Al_{0.03}O_2$ | coprecipitation | 2-step firing | 200 | 232 |

1-step firing: at 750° C. for 10 hours
2-step firing: (at 550° C. for 24 hours) + (at 750° C. for 5 hours)

Comparative Example 1

$Ni_{1-x}Co_x(OH)_2$ obtained by a coprecipitation method, magnesium nitrate, titanium oxide (anatase type), ammonium tetraborate, and lithium hydroxide (LiOH—$H_2O$) were mixed in the same ratio as described in example 1, fired at 550° C. for 24 hours in oxygen atmosphere, pulverized, and further fired at 750° C. for 5 hours.

As a result of phase identification by x-ray diffraction, the obtained compound was found having a layered rock salt structure (hexagonal system: R3m) and a large number of other peaks. Using the compound, a coin-type battery was produced, and the battery's properties were evaluated.

Figure 2:
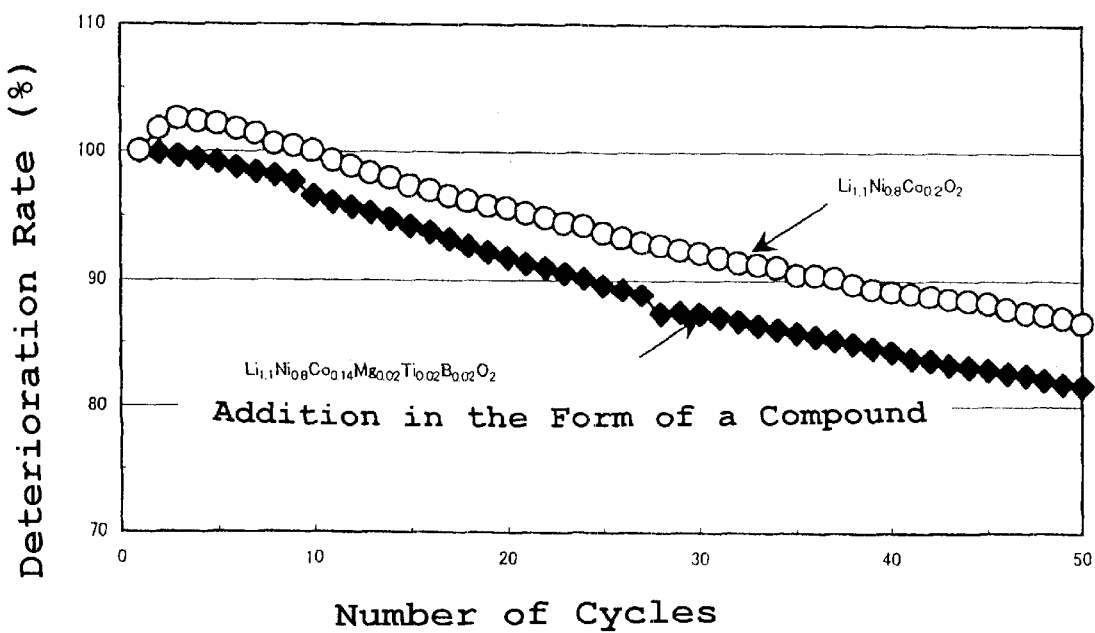
FIG. 2 is a graph showing the cycle properties of a coin type battery produced using a lithium nickelcobaltate obtained in comparative example 1.

FIG. 2 shows the cycle property and that cycle property deterioration was significant. Further, as shown in table 1, active material capacity decreased, and thermal stability was also unimproved.

Thus, in the case where other elements were added in a form of a compound, sufficient mixing in the micro scale cannot be carried out even by a ball mill, so that no single phase is obtained, or the composition becomes uneven. Therefore, it is believed that the failure to improve the properties of the battery is attributable to the above described reasons.

The results of the active material capacity and the thermal stability of the lithium nickelcobaltate obtained in the above described comparative example 1 are shown in Table 1 as well.

Comparative Example 2

Metallic nickel and metallic cobalt were measured as to be Ni:Co=0.8:0.14 (mole ration, hereinafter the same) and dissolved in a 50 wt. % sulfuric acid solution. Magnesium nitrate and titanium chloride were added to the resultant solution as to be Ni:Co:Mg:Ti=0.8:0.14:0.03:0.03 and the concentration of the solution was adjusted as to control the total of nickel, cobalt, magnesium, and titanium to be 60 g/L.

Further, ammonium chloride was added to the solution to control pH to about 5, and then a 6 mol/L sodium hydroxide solution was added to coprecipitate mixed hydroxides.

LiOH—$H_2O$ was then added to the obtained powder as to be Li:(Ni+Co+Mg+Ti)=1.1:1 and the resultant mixture was mixed and fired at 550° C. for 24 hours in oxygen atmosphere, pulverized, and further fired at 750° C. for 5 hours.

As a result of phase identification by x-ray diffraction, the obtained compound had a layered rock salt structure (hexagonal system: R3m) and no other phase was detected. A coin type battery was produced using the compound and the battery's properties were evaluated.

Figure 3:
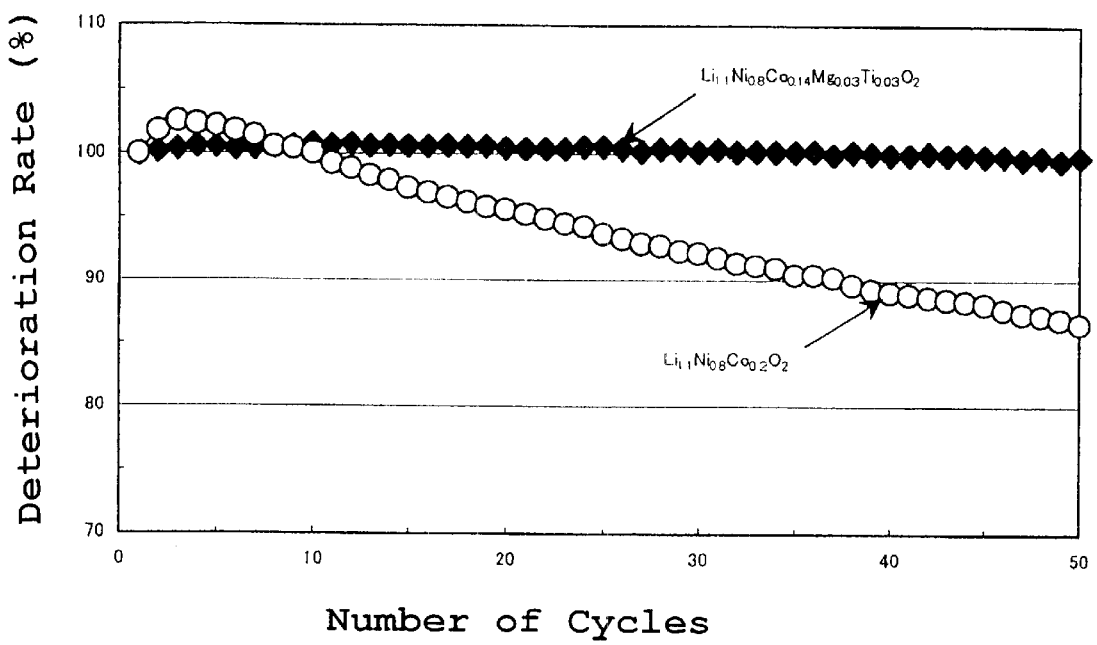
FIG. 3 is a graph showing the cycle properties of a coin type battery produced using a lithium nickelcobaltate obtained in comparative example 2.

FIG. 3 shows the cycle property and that cycle property deterioration was extremely scarce. The active material capacity was significantly reduced as compared with that of the example 1 and as for the thermal stability, no oxygen release temperature increase was observed.

The results of the active material capacity and the thermal stability of the lithium nickelcobaltate obtained in the above described comparative example 2 are shown in Table 1 as well.

Comparative Example 3

Metallic nickel and metallic cobalt were measured to be Ni:Co=0.8:0.14 (mole ration, hereinafter the same) and dissolved in a 50 wt % sulfuric acid solution. Magnesium nitrate and ammonium tetraborate were added to the resultant solution so as to be Ni:Co:Mg:B=0.8:0.14:0.03:0.03 and the concentration of the solution was adjusted as to control the total of nickel, cobalt, magnesium, and boron to be 60 g/L.

Further, ammonium chloride was added to the solution to control pH to about 5, and then a 6 mol/L sodium hydroxide solution was added to coprecipitate mixed hydroxides. The hydroxides after the coprecipitation were washed several times and dried.

LiOH—$H_2O$ was then added to the obtained powder so as to be Li:(Ni+Co+Mg+B)=1.1:1 and the resultant mixture was mixed and fired at 550° C. for 24 hours in oxygen atmosphere, pulverized, and further fired at 750° C. for 5 hours.

As a result of phase identification by x-ray diffraction, the obtained compound had a layered rock salt structure (hexagonal system: R3m) and no other phase was detected. A coin type battery was produced using the compound and the battery's properties were evaluated.

Figure 4:
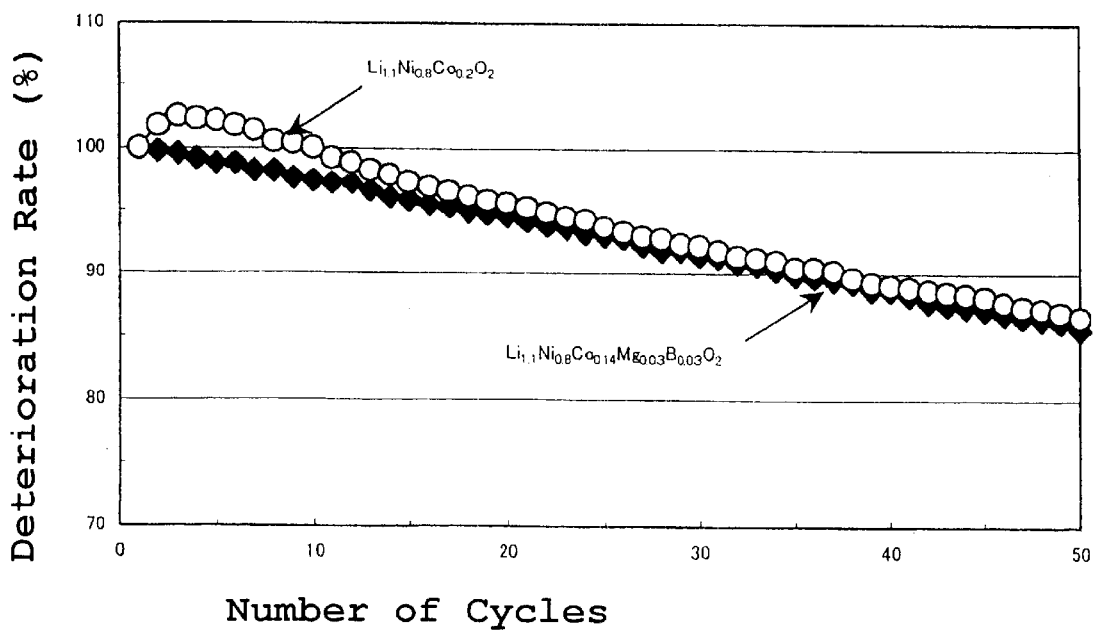
FIG. 4 is a graph showing the cycle properties of a coin type battery produced using a lithium nickelcobaltate obtained in comparative example 3.

FIG. 4 shows the cycle property and that cycle property deterioration was significant. The active material capacity was slightly reduced, and the thermal stability was found improved.

The results of the active material capacity and the thermal stability of the lithium nickelcobaltate obtained in the above described comparative example 3 are shown in Table 1 as well.

Comparative Example 4

Metallic nickel and metallic cobalt were measured to be Ni:Co=0.8:0.14 (mole ration, hereinafter the same) and dissolved in a 50 wt % sulfuric acid solution. Aluminum nitrate and magnesium nitrate were added to the resultant solution so as to be Ni:Co:Mg:Al=0.8:0.14:0.03:0.03 and the concentration of the solution was adjusted to control the total of nickel, cobalt, magnesium, and aluminum to be 60 g/L.

Further, ammonium chloride was added to the solution to control pH to about 5, and then a 6 mol/L sodium hydroxide solution was added to coprecipitate mixed hydroxides. The hydroxides after the coprecipitation were washed several times and dried.

LiOH—$H_2O$ was then added to the obtained powder so as to be Li:(Ni+Co+Mg+Al)=1.1:1 and the resultant mixture was mixed and fired at 550° C. for 24 hours in oxygen atmosphere, pulverized, and further fired at 750° C. for 5 hours.

As a result of phase identification by x-ray diffraction, the obtained compound had a layered rock salt structure (hexagonal system: R3m) and no other phase was detected. A coin type battery was produced using the compound and the battery's properties were evaluated.

Figure 5:
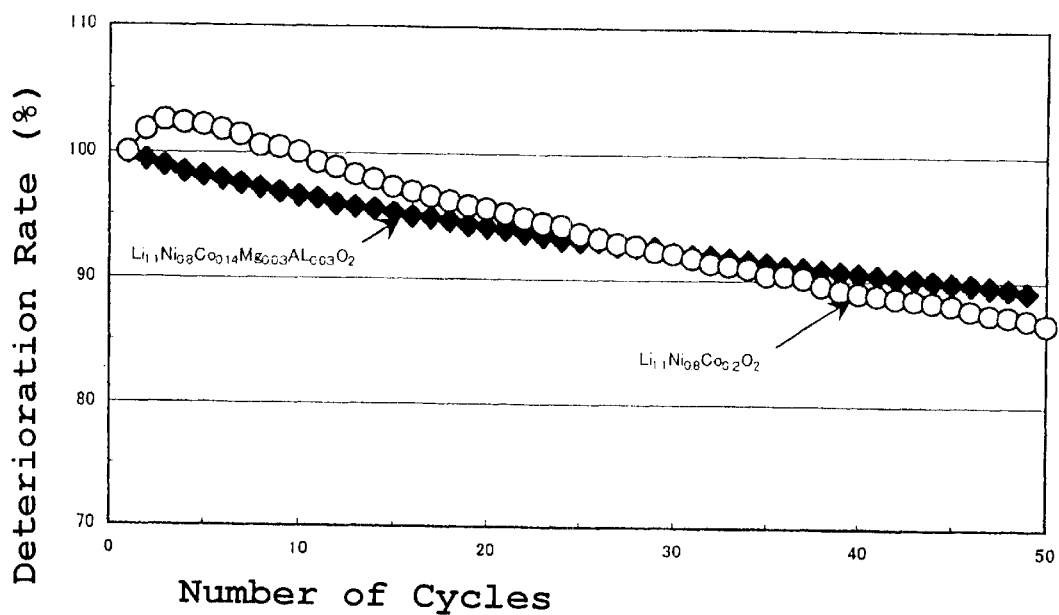
FIG. 5 is a graph showing the cycle properties of a coin type battery produced using a lithium nickelcobaltate obtained in comparative example 4.

FIG. 5 shows the cycle property and that cycle property deterioration was not improved at all. The active material capacity was slightly reduced, and the thermal stability was found slightly improved.

The results of the active material capacity and the thermal stability of the lithium nickelcobaltate obtained in the above described comparative example 4 are shown in Table 1 as well.

As described above, the present invention provides a cathode material which is a layered compound having a general formula: $Li_xNi_{1-a-b-c-d}Co_aM_{1b}M_{2c}M_{3d}O_2$ of which $M_1$, $M_2$ and $M_3$ are selected from Ti, Mg, B, and Al and in which the characters x, a, b, c and d respectively satisfy $1.0 \leq x \leq 1.2$; $0.1 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$ to provide a high capacity, an excellent cycle property and an excellent thermal stability.

Further, the present invention makes it possible to stably provide the foregoing layered compound with uniform property by mixing $Ni_{1-a-b-c-d}Co_aM_{1b}M_{2c}M_{3d}(OH)_2$ produced by a coprecipitation method with an Li compound and firing the mixture at 480 to 850° C. in oxygen atmosphere.

Furthermore, a material with a further high capacity can stably be provided by firing a mixture of the compounded hydroxides obtained by a coprecipitation method and a lithium compound at 480 to 630° C. for 15 to 40 hours, pulverizing the obtained material, and further firing the pulverized material at 700 to 850° C. for 3 to 10 hours.

What is claimed is:

1. A method for producing a cathode material for a lithium secondary battery, wherein the cathode material is a layered compound having a general formula of $Li_xNi_{1-a-b-c-d}Co_aM_{1b}M_{2c}M_{3d}O_2$, wherein $M_1$, $M_2$ and $M_3$ are selected from the group consisting of Ti, Mg, B and Al, and wherein the reference characters x, a, b, c and d satisfy: $1.0 \leq x \leq 1.2$; $0.1 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$, comprising the steps of: coprecipitating $Ni_{1-a-b-c-d}Co_aM_{1b}M_{2c}M_{3d}(OH)_2$, mixing $Ni_{1-a-b-c-d}Co_aM_{1b}M_{2c}M_{3d}(OH)_2$ and Li compound, and firing the resultant mixture at 480 to 850° C.

2. A method according to claim 1, wherein said firing step is accomplished in atmospheric air.

3. A method according to claim 1, wherein said firing step is accomplished in an oxygen atmosphere.

4. A method for producing a cathode material for a lithium secondary battery, wherein the cathode material is a layered compound having a general formula of $Li_xNi_{1-a-b-c-d}Co_aM_{1b}M_{2c}M_{3d}O_2$, wherein $M_1$, $M_2$ and $M_3$ are selected from the group consisting of Ti, Mg, B and Al, and wherein the reference characters x, a, b, c and d satisfy: $1.0 \leq x \leq 1.2$; $0.1 \leq a \leq 0.3$; $0.005 \leq b \leq 0.1$; $0.005 \leq c \leq 0.1$; $0.005 \leq d \leq 0.1$; and $0.115 \leq a+b+c+d \leq 0.4$, comprising the steps of: coprecipitating $Ni_{1-a-b-c-d}Co_aM_{1b}M_{2c}M_{3d}(OH)_2$: mixing said $Ni_{1-a-b-c-d}Co_aM_{1b}M_{2c}M_{3d}(OH)_2$ and an Li compound; firing the resultant mixture at 480 to 630° C. for 15 to 40 hours; pulverizing the material after said mixing and firing step; and further firing the material after said pulverizing step at 700 to 850° C. for 3 to 10 hours.

5. A method according to claim 4, wherein said firing step and said further firing step are accomplished in atmospheric air.

6. A method according to claim 4, wherein said firing step and said further firing step is accomplished in an oxygen atmosphere.

* * * * *

UNITED STATES PATENT AND TRADEMARK OFFICE
CERTIFICATE OF CORRECTION

PATENT NO. : 6,497,854 B2  
DATED : December 24, 2002  
INVENTOR(S) : Kenji Kohiro and Ryuichi Nagase It is certified that error appears in the above-identified patent and that said Letters Patent is hereby corrected as shown below:

<u>Title page,</u>  
Item [57], ABSTRACT,  
Line 7, "satisfy $1.0 \leq x \leq 1.2$; $0.3 \leq a \leq 0.3$;" should read -- satisfy $1.0 \leq x \leq 1.2$; $0.1 \leq a \leq 0.3$; --

<u>Column 3,</u>  
Line 7, "$Li_xN_{1-a}Co_aO_2$" should read -- $Li_xNi_{1-a}Co_aO_2$ --  
Line 24, "$CO_aM_{1b}M_{2c}M_{3d}O_2$" should read -- $Co_aM_{1b}M_{2c}M_{3d}O_2$ --  
Line 42, "$CO_aM_{1b}M_{2c}M_{3d}O(OH)_2$" should read -- $Co_aM_{1b}M_{2c}M_{3d}(OH)_2$ --

<u>Column 4,</u>  
Line 17, "$Li_xNi_{1-a}CO_aO_2$" should read -- $Li_xNi_{1-a}Co_aO_2$ --

<u>Column 5,</u>  
Line 14, "$Li_xNi_{1-a-b-c-d}CO_aM_{1b}M_{2c}M_{3d}O_2$" should read  
-- $Li_xNi_{1-a-b-c-d}Co_aM_{1b}M_{2c}M_{3d}O_2$ --

<u>Column 10,</u>  
Line 20, "$(OH)_2$, mixing" should read -- $(OH)_2$, mixing said --  
Line 30, "$Li_xNi_{1-a-b-c-d}CO_aM_{1b}M_{2c}M_{3d}O_2$" should read  
-- $Li_xNi_{1-a-b-c-d}Co_aM_{1b}M_{2c}M_{3d}O_2$ --

Signed and Sealed this

Seventeenth Day of June, 2003

JAMES E. ROGAN  
*Director of the United States Patent and Trademark Office*